US012090497B2

(12) United States Patent
Ying et al.

(10) Patent No.: US 12,090,497 B2
(45) Date of Patent: Sep. 17, 2024

(54) SHOWERHEAD WITH MULTIPLE PAIRS OF NOZZLES THAT ACTUATE SEQUENTIALLY IN A LOOP

(71) Applicant: Homewerks Worldwide, LLC, Lake Bluff, IL (US)

(72) Inventors: Jian Ying, Dongguan (CN); John Charles Holzheimer, Chagrin Falls, OH (US)

(73) Assignee: HOMEWERKS WORLDWIDE, LLC, Lake Bluff, IL (US)

( * ) Notice: Subject to any disclaimer, the term of this patent is extended or adjusted under 35 U.S.C. 154(b) by 477 days.

(21) Appl. No.: 17/415,021

(22) PCT Filed: Mar. 22, 2019

(86) PCT No.: PCT/CN2019/079265

§ 371 (c)(1),
(2) Date: Jun. 17, 2021

(87) PCT Pub. No.: WO2020/191523

PCT Pub. Date: Oct. 1, 2020

(65) Prior Publication Data

US 2022/0062924 A1 Mar. 3, 2022

(51) Int. Cl.
*B05B 1/18* (2006.01)
*B05B 1/08* (2006.01)
*B05B 3/04* (2006.01)

(52) U.S. Cl.
CPC ................ *B05B 1/18* (2013.01); *B05B 1/083* (2013.01); *B05B 3/04* (2013.01)

(58) Field of Classification Search
CPC .. B05B 1/18; B05B 1/083; B05B 3/04; B05B 1/08
See application file for complete search history.

(56) References Cited

U.S. PATENT DOCUMENTS 8,366,024 B2 2/2013 Leber
8,794,543 B2 8/2014 Leber
(Continued)

FOREIGN PATENT DOCUMENTS

CN 102179324 9/2011
CN 103079441 5/2013
(Continued)

OTHER PUBLICATIONS

International Search Report, dated Aug. 2, 2019, issued in connection with PCT/CN2019/079265, filed Mar. 22, 2019.
(Continued)

*Primary Examiner* — Qingzhang Zhou
*Assistant Examiner* — Joel Zhou
(74) *Attorney, Agent, or Firm* — Cozen O'Connor

(57) ABSTRACT

A showerhead (2) and a pulsation mechanism thereof are disclosed. The showerhead (2) with three sets of spaced-apart nozzles (22*a*, 22*b*, 22*c*) is configured to be cyclically activated in sequence, with each set of nozzles (22*a*, 22*b*, 22*c*) operative for approximately 0.25 seconds to 1 second, while the other two sets of nozzles (22*a*, 22*b*, 22*c*) are deactivated. The showerhead (2) includes a shutter (34) adapted to open a flow passage (36) within the showerhead (2) leading to one or more respective nozzles (22*a*, 22*b*, 22*c*) periodically to produce an intermittent pulsating flow.

16 Claims, 4 Drawing Sheets

(56) References Cited

U.S. PATENT DOCUMENTS

| | | | | |
|---|---|---|---|---|
| 9,308,540 | B2 | 4/2016 | Alcamo | |
| 2008/0156897 | A1 * | 7/2008 | Leber | B05B 3/04 239/383 |
| 2008/0156902 | A1 | 7/2008 | Luettgen et al. | |

FOREIGN PATENT DOCUMENTS

| | | | |
|---|---|---|---|
| CN | 203184129 | | 9/2013 |
| CN | 207641680 | | 7/2018 |
| CN | 207970996 | | 10/2018 |
| EP | 0461089 | A2 | 12/1991 |

OTHER PUBLICATIONS

Written Opinion of the International Searching Authority, dated Aug. 15, 2019, issued in connection with PCT/CN2019/079265, filed Mar. 22, 2019.

Notification of the Recording of a Change, dated Apr. 17, 2019, issued in connection with PCT/CN2019/079265.

* cited by examiner

SHOWERHEAD WITH MULTIPLE PAIRS OF NOZZLES THAT ACTUATE SEQUENTIALLY IN A LOOP

BACKGROUND

The present exemplary embodiment relates to devices for dispensing water. It finds particular application in conjunction with showerheads, and will be described with particular reference thereto. However, it is to be appreciated that the present exemplary embodiment is also amenable to other like applications.

Showerheads with multiple modes of operation have become popular. For example, some showerheads have multiple different spray patterns, and some can be used either as a normal showerhead or as a massaging (e.g., pulsating) shower head. In such showerheads offering a massage mode, a shutter is often used for opening and closing a flow passageway within the showerhead to generate the pulsation effect. The shutter is typically driven (either directly or indirectly via a turbine) by the flow of water through the showerhead. As the shutter rapidly opens and closes the flow passage, the flow of water is rapidly "chopped" into discrete portions. This produces a pulsation of water exiting the showerhead.

In some applications, the water is chopped so rapidly that the massaging effect is diminished. That is, for certain flow rates the shutter operates so rapidly that the pulsation generated is less than desirable, or not fully detectable by a user.

BRIEF DESCRIPTION

It has been found that an improved massage mode is generated by a showerhead having multiple pairs of nozzles that are sequentially activated in a loop such that the water exiting the showerhead targets slightly different areas of a user in a pulsed manner. In one example, three sets of spaced-apart nozzles are configured to be cyclically activated in sequence, with each set of nozzles operative for approximately 0.25 seconds to 1 second, while the other two sets of nozzles are deactivated. The showerhead includes a shutter adapted to open a flow passage within the showerhead leading to one or more respective nozzles periodically to produce an intermittent pulsating flow.

In accordance with one aspect of the present exemplary embodiment, a pulsation mechanism for a showerhead, comprises a housing having a chamber in fluid communication with a fluid inlet and at least one fluid outlet, a shutter supported for rotation about a central axis within the chamber, the shutter configured to block and permit flow from the fluid inlet to the at least one fluid outlet during respective portions of a revolution of the shutter, and a turbine supported for rotation within the chamber about an axis offset from the central axis. The shutter includes a central opening having a plurality of internal gear teeth, and the rotor includes a hub having a circumferential surface with at least one external gear tooth for engaging the internal gear teeth of the shutter, at least a portion of the circumferential surface of the hub not having an external gear tooth, whereby rotation of the turbine causes the at least one external gear tooth to periodically engage the internal gear teeth of the shutter to intermittently drive the shutter at a rate of rotation that is less than the rate of rotation of the turbine.

The shutter can include a flange having an arcuate aperture adapted to permit flow from the fluid inlet to the at least one fluid outlet when the aperture is aligned with the at least one fluid outlet. The housing can include three equally circumferentially spaced fluid outlets, and the aperture can have a size such that only a single fluid outlet is aligned with the aperture at any given point in a revolution of the shutter. At least a portion of the circumferential surface of the hub not having an external gear tooth can be spaced apart from the internal gear teeth of the shutter. The mechanism can further include a pin about which the turbine is configured to rotate, an end of the pin received in a recess of the housing. An outer circumferential surface of the shutter can be smooth. A diameter of the shutter can be greater than a diameter of the turbine. The shutter can be closely received in the chamber of the housing such that translational movement of the shutter orthogonal to the central axis of rotation of the shutter is restricted.

In accordance with another aspect, a showerhead comprises a showerhead housing having a water inlet for connection to a water supply and a showerhead face having a plurality of nozzles for dispensing water received at the inlet, and a pulsation mechanism supported by the showerhead housing. The pulsation mechanism comprises a housing having a chamber in fluid communication with a fluid inlet for receiving water from water inlet and at least one fluid outlet in fluid communication with at least one of the plurality of nozzles, a shutter supported for rotation about a central axis within the chamber, the shutter configured to block and permit flow from the fluid inlet to the at least one fluid outlet during respective portions of a revolution of the shutter, and a turbine supported for rotation within the chamber about an axis offset from the central axis. The shutter includes a central opening having a plurality of internal gear teeth, and the rotor includes a hub having a circumferential surface with at least one external gear tooth for engaging the internal gear teeth of the shutter, at least a portion of the circumferential surface of the hub not having an external gear tooth. Rotation of the turbine causes the at least one external gear tooth to periodically engage the internal gear teeth of the shutter to intermittently drive the shutter at a rate of rotation that is less than the rate of rotation of the turbine.

The shutter can include a flange having an arcuate aperture adapted to permit flow from the fluid inlet to the at least one fluid outlet when the aperture is aligned with the at least one fluid outlet. The housing can include three equally circumferentially spaced fluid outlets, and the aperture can have a size such that only a single fluid outlet is aligned with the aperture at any given point in a revolution of the shutter. At least a portion of the circumferential surface of the hub not having an external gear tooth can be spaced apart from the internal gear teeth of the shutter. The mechanism can further include a pin about which the turbine is configured to rotate, an end of the pin received in a recess of the housing. An outer circumferential surface of the shutter can be smooth. A diameter of the shutter can be greater than a diameter of the turbine. The shutter can be closely received in the chamber of the housing such that translational movement of the shutter orthogonal to the central axis of rotation of the shutter is restricted.

DETAILED DESCRIPTION

Figure 1:
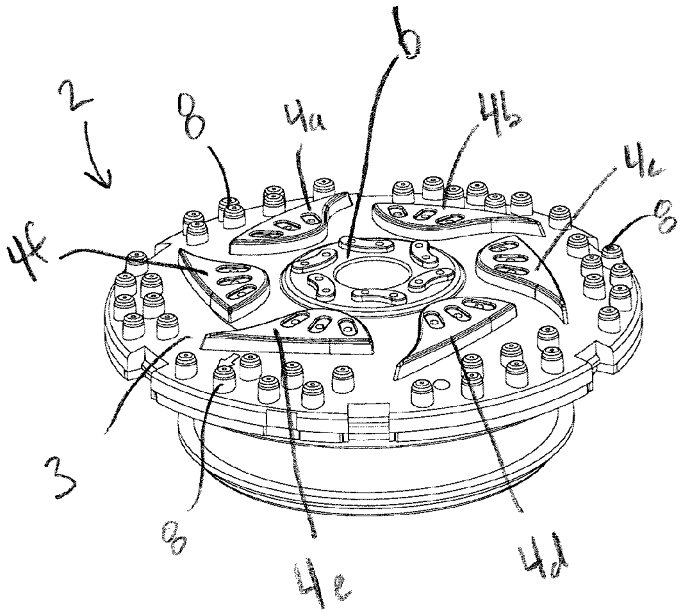
FIG. 1 is a front perspective view of an exemplary showerhead in accordance with the present disclosure.

With reference to FIGS. 1-4, and initially to FIG. 1, an exemplary showerhead 2 in accordance with the present disclosure is illustrated and identified by reference numeral 2. The showerhead 2 includes a face 3 having a banks of nozzles 4*a*, 4*b*, 4*c*, 4*d*, 4*e* and 4*f*. Each bank of nozzles 4*a*-4*f* in the illustrated embodiment includes three nozzles and is spaced circumferentially about an inner nozzle bank 6. Surrounding the banks of nozzles 4*a*-4*f* are a plurality of outer nozzles 8. Water can be configured to flow through any combination of the nozzles as desired. In one mode, water is configured to flow sequentially or periodically from one or more of the banks of nozzles 4*a*-4*f* to produce a massage or pulsation effect.

Figure 2:
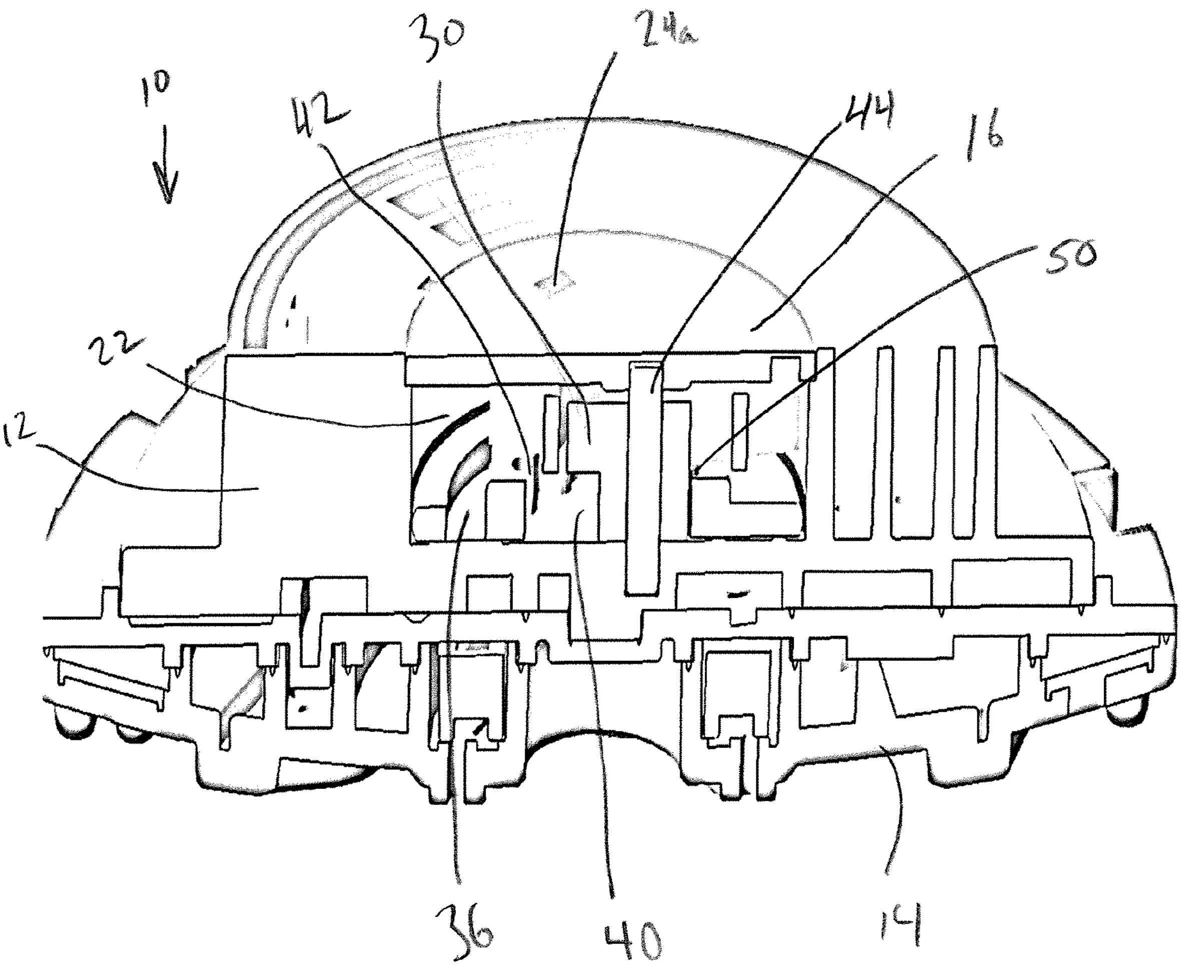
FIG. 2 is cross-sectional view of the showerhead of FIG. 1 taken along the line 2-2.
Figure 3:
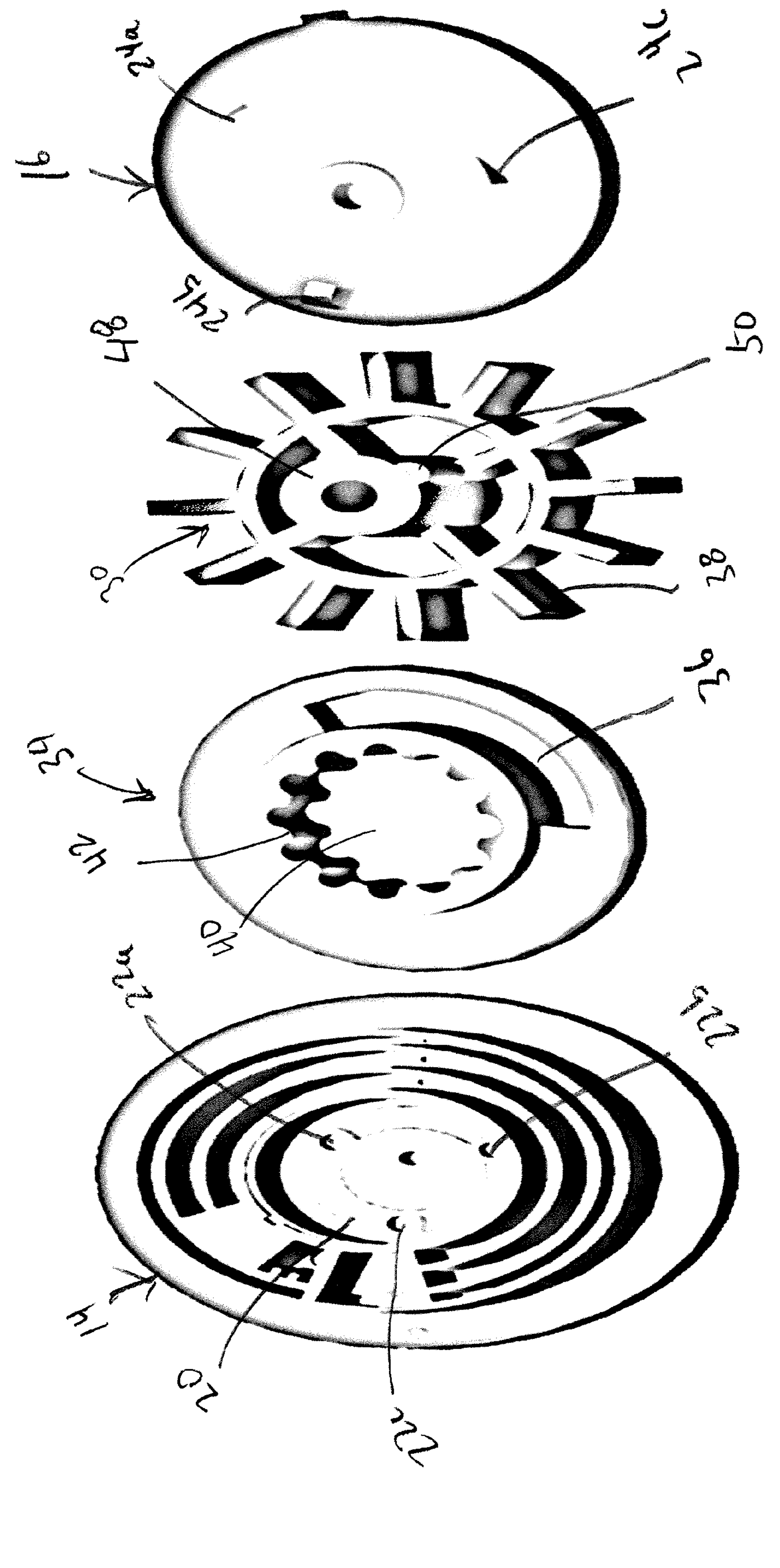
FIG. 3 is an exploded view of a pulsation mechanism of the showerhead in accordance with the present disclosure.
Figure 4:
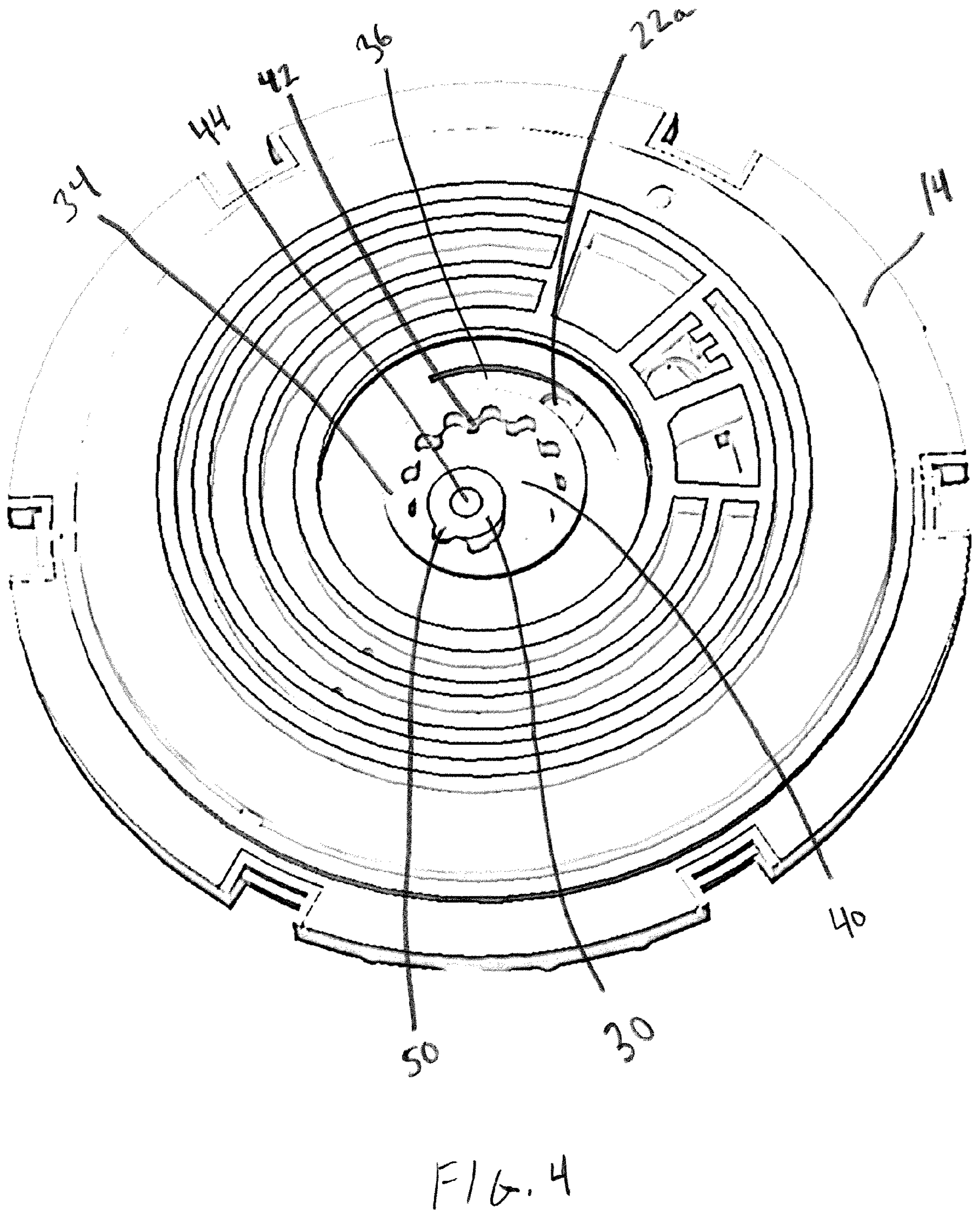
FIG. 4 is a perspective top view of the pulsation mechanism with a portion of the housing removed to show interior components.

With reference to FIGS. 2-4, an exemplary shutter assembly for producing the above-mentioned pulsation in accordance with the present disclosure is illustrated and identified generally by reference numeral 10. The shutter assembly 10 includes a housing 12, which is generally comprised of first and second housing portions 14 and 16. The first housing portion includes a recess 20 having three flow ports 22*a*, 22*b* and 22*c* that are in fluid communication with a respective set of nozzles (see FIG. . . . ) of the showerhead 10. The second housing portion 16 encloses the recess 20 to define a chamber 22 and includes three intake jet ports 24*a*, 24*b*, and 24*c* for directing flow at an angle into the recess 20 to produce a swirling flow therein. The second housing portion 16 is also referred to as a jet plate. Although three jet ports 24*a*, 24*b* and 24*c* are shown, any number of jet ports can be used. Each jet port extends through the jet plate 16 to create a flow path for fluid to enter the shutter assembly 10.

A turbine 30 and shutter 34 are supported within the chamber 22 for rotation. The shutter 34 includes an aperture 36 for water to pass therethrough to one or more of the flow ports 22*a*, 22*b* and 22*c*, when the aperture is aligned therewith. When the aperture exposes a flow port 22*a*, 22*b*, and/or 22*c*, water may flow from the chamber to the exposed flow port or ports, and onward to a (one or more) respective bank of nozzles 37*a*, 37*b*, 37*c* on a face of the showerhead. As the shutter 34 rotates to expose and block the flow ports 22*a*, 22*b*, and/or 22*c*, the desired pulsating flow is achieved.

The shutter 34 has a central opening 40 having internal gear teeth 42. The turbine 30 is supported for rotation within the chamber 22 on a pin 44 that is received in respective recesses in the first and second housing portions 14 and 16. The turbine 30 includes a plurality of vanes 38 about its periphery that are configured to react to the flow of fluid through jet ports 24*a*, 24*b* and 24*c* to rotate the turbine 30 about the pin 44.

The turbine 30 further includes a hub 48 having a gear tooth 50 that is adapted to periodically mate (e.g., engage and disengage) with the internal gear teeth 42 of the shutter 34 as the turbine 30 rotates. Although a single gear tooth 50 is illustrated, the turbine 30 could include more than one gear tooth. In general, however, most embodiments will have between one and three external gear teeth.

As best seen in FIG. 4, the turbine 30 is mounted in an off-set position relative to the shutter 34. That is, the turbine 30 and shutter 34 rotate about respective axes that are parallel but offset. As such, as the turbine 30 rotates the external gear tooth 50 engages and disengages the internal gear teeth 42 of the shutter 34. The shutter 34 is therefore only driven by the turbine 30 for a fraction of each revolution of the turbine 30. This results in the shutter 34 opening and closing the flow ports 22*a*, 22*b* and 22*c* at a much slower rate than would be the case if the turbine 30 were to be configured to constantly drive the shutter 34.

It should be appreciated that the reduction in speed of the rotation of the shutter 34 can be a function of the ratio of the amount of time the turbine 30 drives the shutter 34 to the amount of time the turbine 30 is not driving the shutter 34, for a given revolution of the turbine 30. The amount of time the turbine 30 drives the shutter 34 can be determined by the number of external teeth 50, and or the diameter of the hub 48. A larger diameter hub 48 will generally allow an external gear tooth to remain engaged with the internal gear teeth 42 of the shutter 34 for a longer portion of a revolution than a smaller diameter hub. In addition, for a fixed rate of turbine rotation, a larger hub will impart a slower rate of rotation to the shutter 34 than a smaller diameter hub. A person of skill in the art will recognize that these properties can be used to tune the shutter to provide a desired pulsation effect.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A pulsation mechanism for a showerhead, comprising: a housing having a chamber in fluid communication with a fluid inlet and at least one fluid outlet; a shutter supported for rotation about a central axis within the chamber, the shutter configured to block and permit flow from the fluid inlet to the at least one fluid outlet during respective portions of a revolution of the shutter; a turbine supported for rotation within the chamber about an axis offset from the central axis; wherein the shutter includes a central opening having a plurality of internal gear teeth; and wherein the turbine includes a hub having a circumferential surface with at least one external gear tooth for engaging the internal gear teeth of the shutter, at least a portion of the circumferential surface of the hub not having an external gear tooth; whereby rotation of the turbine causes the at least one external gear tooth to periodically engage the internal gear teeth of the shutter to intermittently drive the shutter at a rate of rotation that is less than the rate of rotation of the turbine.

2. The pulsation mechanism of claim 1, wherein the shutter includes a flange having an arcuate aperture adapted to permit flow from the fluid inlet to the at least one fluid outlet when the aperture is aligned with the at least one fluid outlet.

3. The pulsation mechanism of claim 2, wherein the housing includes three equally circumferentially spaced fluid outlets, and wherein the aperture has a size such that only a single fluid outlet is aligned with the aperture at any given point in a revolution of the shutter.

4. The pulsation mechanism of claim 1, wherein the at least a portion of the circumferential surface of the hub not having an external gear tooth is spaced apart from the internal gear teeth of the shutter.

5. The pulsation mechanism of claim 1, further comprising a pin about which the turbine is configured to rotate, an end of the pin received in a recess of the housing.

6. The pulsation mechanism of claim 1, wherein an outer circumferential surface of the shutter is smooth.

7. The pulsation mechanism of claim 1, wherein a diameter of the shutter is greater than a diameter of the turbine.

8. The pulsation mechanism of claim 1, wherein the shutter is received in the chamber of the housing such that translational movement of the shutter orthogonal to the central axis of rotation of the shutter is restricted.

9. A showerhead comprising: a showerhead housing having a water inlet for connection to a water supply and a showerhead face having a plurality of nozzles for dispensing water received at the water inlet; and a pulsation mechanism supported by the showerhead housing, the pulsation mechanism comprising: a housing having a chamber in fluid communication with a fluid inlet for receiving water from the water inlet and at least one fluid outlet in fluid communication with at least one of the plurality of nozzles; a shutter supported for rotation about a central axis within the chamber, the shutter configured to block and permit flow from the water inlet to the at least one water outlet during respective portions of a revolution of the shutter; a turbine supported for rotation within the chamber about an axis offset from the central axis; wherein the shutter includes a central opening having a plurality of internal gear teeth; and wherein the turbine includes a hub having a circumferential surface with at least one external gear tooth for engaging the internal gear teeth of the shutter, at least a portion of the circumferential surface of the hub not having an external gear tooth; whereby rotation of the turbine causes the at least one external gear tooth to periodically engage the internal gear teeth of the shutter to intermittently drive the shutter at a rate of rotation that is less than the rate of rotation of the turbine.

10. The showerhead of claim 9, wherein the shutter includes a flange having an arcuate aperture adapted to permit flow from the fluid inlet to the at least one fluid outlet when the aperture is aligned with the at least one fluid outlet.

11. The showerhead of claim 10, wherein the housing includes three equally circumferentially spaced fluid outlets, and wherein the aperture has a size such that only a single fluid outlet is aligned with the aperture at any given point in a revolution of the shutter.

12. The showerhead of claim 9, wherein the at least a portion of the circumferential surface of the hub not having an external gear tooth is spaced apart from the internal gear teeth of the shutter.

13. The showerhead of claim 9, further comprising a pin about which the turbine is configured to rotate, an end of the pin received in a recess of the housing.

14. The showerhead of claim 9, wherein an outer circumferential surface of the shutter is smooth.

15. The showerhead of claim 9, wherein a diameter of the shutter is greater than a diameter of the turbine.

16. The showerhead of claim 9, wherein the shutter is received in the chamber of the housing such that translational movement of the shutter orthogonal to the central axis of rotation of the shutter is restricted.

* * * * *